Patented Oct. 6, 1953

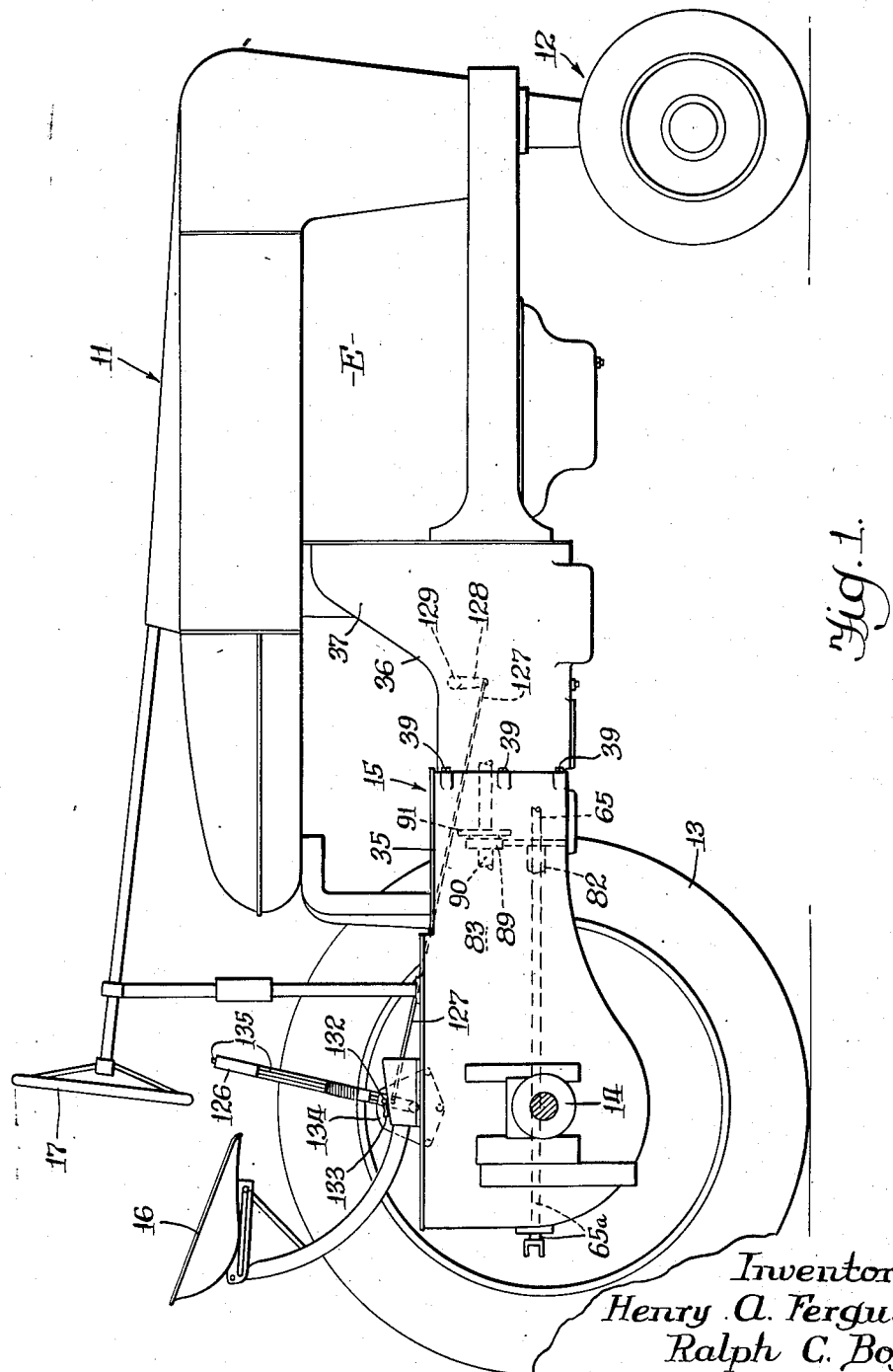

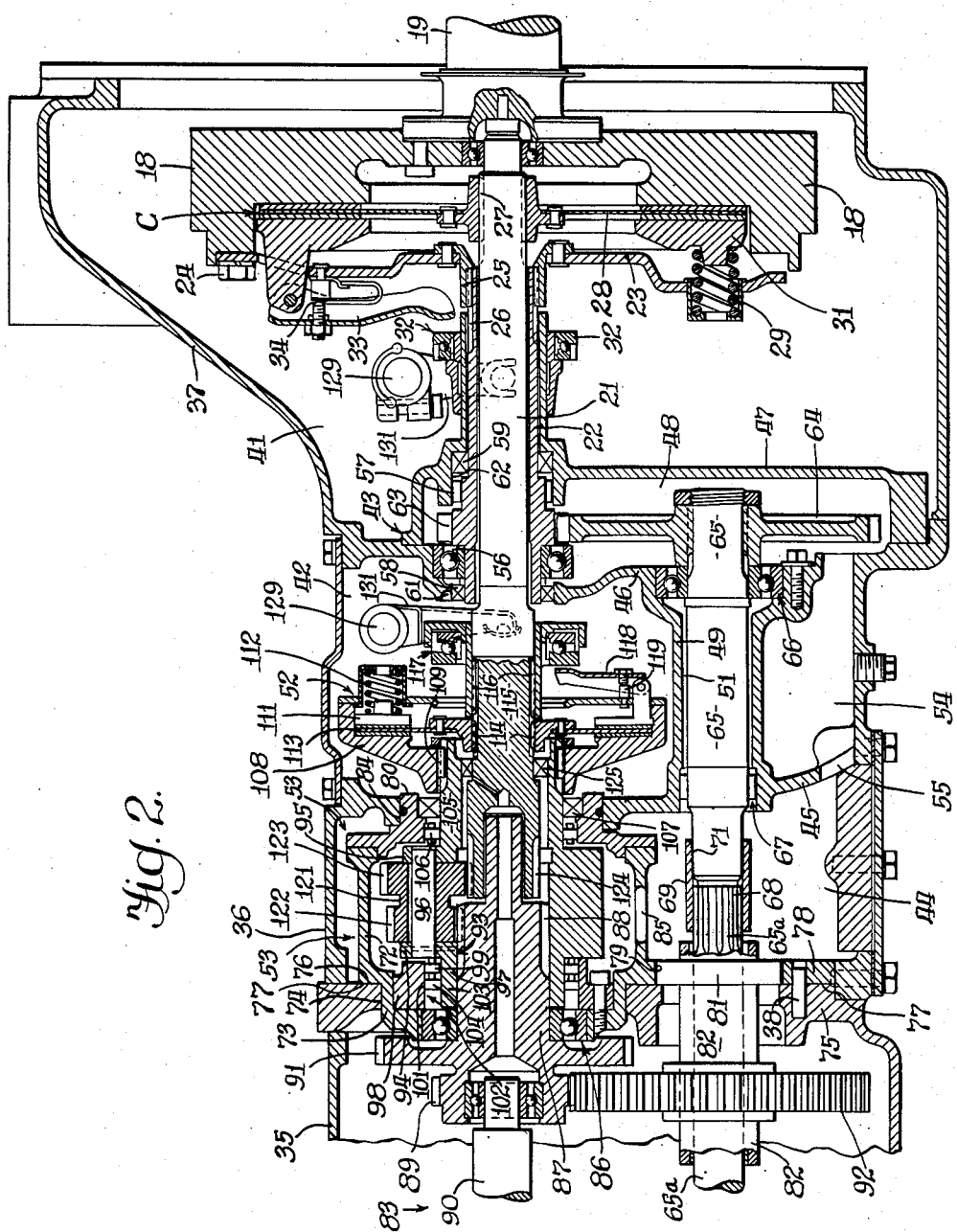

2,654,255

UNITED STATES PATENT OFFICE 2,654,255

TRACTOR BODY FRAME WITH SUPPLEMENTARY POWER TRANSMITTING AND DIVIDING APPARATUS

Henry A. Ferguson, Lombard, and Ralph C. Boyle and Edmund Jedrzykowski, Chicago, Ill., assignors to International Harvester Company, a corporation of New Jersey Application August 31, 1951, Serial No. 244,676

11 Claims. (Cl. 74—15.63)

This invention concerns tractor vehicles having a body-frame casing, and relates more in particular to the combination with a portion of such casing of power-transmitting apparatus enclosed therein for optionally amplifying torque transmitted from the vehicle engine to the traction wheels, the apparatus also including a train receiving power from the tractor engine and extending through the casing for independent power take-off.

A common form of farm tractor includes a body frame casing projecting rearwardly to transversely extending rear axle housings. An enlarged diameter part of the frame casing immediately rearwardly of the engine contains a main clutch through which power is transmittable to and through a long shaft extending through a forward portion of the casing into a rearward portion thereof containing change-speed gearing by means of which the rear axles are drivable at selective speeds relative to the engine. Because of the slow speed at which vehicles of this character are driven, there is insufficient vehicle inertia to maintain forward movement of the vehicle during shifting from a low speed connection of the transmission to a higher speed connection thereof. This is particularly true when the vehicle is towing earth-working tools, for example, a plow. Under these circumstances the vehicle operator must start the vehicle and its load from rest in a pre-selected speed connection through the transmission. If soil conditions vary during operation of the equipment, making it possible to travel at a greater speed than initially selected, the operator must allow the tractor to come to rest before selecting the higher speed connection in the transmission. Conversely, if the working conditions for the equipment should change so more power is required to propel the equipment than is available at a selected speed, the vehicle will necessarily be brought to rest before shifting into a lower speed connection.

A general object of this invention is the provision in a tractor frame casing forwardly of the change-speed transmission unit of a torque-amplifying unit capable of substantially instantaneous adjustment into a torque amplifying condition for transmitting torque to the input shaft of the transmission at an increased value, though slower speed, thereby making it unnecessary to bring the vehicle to rest incident to establishing an overall ratio of speed transmission and a correspondingly higher torque to enable the vehicle to proceed without overloading the engine. Much time is saved by the operator by employing such a torque amplifying unit in complemental supplementary relation with the conventional transmitting unit, in addition to avoiding numerous engine-overload periods.

A further object is the provision in a tractor frame having a rear body frame casing separable from a front body frame casing, of a reinforcing bulkhead within the front frame casing in combination with a casing for a torque amplifier unit connected between the bulkhead and a portion of the rear frame casing to rigidify the connection between these frame casings.

Still another object is the provision in the frame casing of the tractor forwardly of the conventional change-speed transmission unit of a dry compartment defined by fore and aft separated body reinforcing bulkheads for enclosing a control clutch of the torque amplifying unit.

Another object is the provision of a tractor body according to the preceding object wherein there are lubricant-containing compartments respectively forwardly and rearwardly of the dry compartment and intercommunicative through a passage near the bottom of the bulkheads, and such channel being embraced by a body rigidifying wall extending between the bulkheads.

Another object is the provision of a compartmented tractor body casing having a hollow bulkhead at the forward side of a dry compartment, and wherein this hollow bulkhead contains power take-off gearing driven from drive shaft means of the tractor, and a power take-off shaft extending rearwardly through the tractor body by way of a shaft-accommodating passage embraced by a body rigidifying wall extending from the rear wall of the hollow bulkhead to the rear wall of the dry compartment.

The above and other desirable objects inherent in and encompassed by the invention will be elucidated by the ensuing description, the appended claims and the annexed drawings, wherein:

Fig. 1 is a side elevational view of a typical farm tractor having incorporated into the body frame casing thereof supplementary power transmitting apparatus constructed in accordance with the invention, the rear traction wheel of the tractor on the near side of the vehicle being removed for exposing more of the tractor body.

Fig. 2 is an enlarged fragmentary vertical sectional view taken through the tractor frame body and showing parts of the supplementary power-transmitting apparatus in section.

With continued reference to the drawings, and particularly to Fig. 1, there is shown a wheel tractor 11 of the tricycle type supported at its front end upon a steering truck 12, and at its rear end by traction wheels 13, of which that nearest the viewer has been removed for exposing a rear axle housing 14 and a rear portion of the tractor frame casing 15. The tractor has the usual operator's seat 16 and steering wheel 17 manipulative of the steering truck 12 for steering the vehicle. An engine E having a flywheel 18 upon the rear end of its crankshaft 19, Fig. 2, is effective through a conventional friction clutch C for driving a drive shaft means 21—22 of the tractor power transmitting and dividing apparatus at engine speed. A back plate 23 of the clutch C is rigidly secured at its perimeter by cap screws 24 to the rear side of the flywheel 18, and this back plate has an internally splined hub 25 in driving relation with a tubular drive shaft 22 at splines 26 thereof. A shaft component 21 of the drive shaft means 21—22 has a splined connection at 27 with a driven disk 28 of the clutch C. A plurality of springs 29 spaced circumferentially of the back plate 23, one being shown in Fig. 2, normally hold the clutch engaged by forcing an annular pressure plate 31 against the rear face of the clutch disk 28 whereby this disk is frictionally held between such pressure plate and the rear face of the flywheel 18. Release of the clutch disk 28 for disengaging the shaft 21 from the engine is accomplished conventionally by manual force against a throw-out bearing unit 32 for pressing the inner ends of the clutch levers 33 (one being shown) forward, thereby displacing the outer ends of these levers and the pressure plate 31 rearwardly while the levers pivot upon the fulcrum elements 34 mounted on the back plate 23. The tubular drive shaft 22 is permanently connected through the hub 25, back plate 23 and flywheel 18 for rotation with the engine crankshaft.

The tractor body frame 15 comprises a rear frame casing 35 connected at its front end with a front frame casing 36. A forward end portion of the front frame casing 36 is transvesely enlarged to form the usual bell housing 37 for accommodating the clutch C. A circle of dowels 38, of which one is shown in the lower part of Fig. 2, align the front and rear frame casings and a circle of cap screws 39, Fig. 1, prevent endwise separation of these frame casings.

The frame casing 36 includes a front compartment 41 separated from a central compartment 42 by a forward hollow bulkhead 43, and also includes a rear compartment 44 separated from the central compartment 42 by a more rearward bulkhead 45. The forward hollow bulkhead 43 has a rear wall 46 which cooperates with a concavo-convex cover plate 47 constituting a forward wall of this bulkhead to form a lubricant-containing gear casing 48. A bracing wall 49 extends between the rearward wall 46 of the forward bulkhead and the bulkhead 45, such bracing wall embracing a shaft-receiving channel 51 which communicates between the interior of the hollow bulkhead 43 and space rearwardly of the bulkhead 45. The shaft-receiving channel 51 is communicatively isolated from the central compartment 42 which is a dry compartment for housing a releasable friction clutch 52 in control of a torque amplifying unit 53. Lower parts of the bracing wall 49 also embrace a lubricant-confining channel 54 which, at its forward end, communicates with the lower part of the gear casing 48 and which through an opening 55 in the lower part of the bulkhead 45 communicates with the more rearward compartment 44. The bracing wall 49 communicatively isolates the lubricant confining passage 54 from the dry clutch-receiving compartment 42.

The tubular drive shaft 22 is journaled in bearing units 56 and 57 respectively in the rearward and forward walls of the hollow bulkhead 43. Annular sealing devices 58 and 59 cooperate between sections of this tubular drive shaft and bulkhead wall components 61 and 62 to prevent migration of lubricant from the gear casing 48 into the dry compartment 42 and into the dry compartment 41 of the bell housing 37. A gear 63 constrained for rotation with the tubular drive shaft 22 meshes with and drives a gear 64 mounted on and constraining a power take-off shaft component 65 to rotate therewith. This power take-off shaft component is supported by anti-friction bearing units 66 and 67 and extends rearwardly through the shaft-receiving channel 51. The power take-off shaft component 65 is drivingly coupled with a power take-off shaft component 65a, splined at 68 to a sleeve 69, welded at 71 to a rear end portion of the shaft component 65. The power take-off shaft 65—65a extends rearwardly through the rear frame casing 35 and outwardly through the rear end thereof to accommodate attachment of auxiliary equipment to be driven from the tractor engine; see Fig. 1.

A torque amplifier unit casing 72 has a reduced diameter cylindrical portion 73 piloted in a cylindrical opening 74 in a front wall 75 of the rear frame casing 35. A shoulder 76 adjacent the reduced diameter section 73 abuts against the front face 77 of said front wall 75. Also abutting against the front face 77 of the casing front wall 75 is a flange-like extension 78 of the torque casing 72 to facilitate anchoring of this casing rigidly to the wall 75. An opening 79 in the flange-like extension 78 supports an anti-friction bearing unit 81 wherein there is journaled the forward end of a tubular countershaft 82 of a conventional change-speed transmission unit 83 housed by the rear frame casing 35. Only gears 89 and 92 and a driven shaft 90 of this transmission unit are shown in addition to the countershaft 82. The power take-off shaft 65—65a projects coaxially through this transmission countershaft 82 for rotation independently thereof.

A forward reduced diameter section 80 of the torque amplifying unit casing 72 is piloted in an opening 84 of the rear bulkhead wall 45. Such piloting of the torque amplifying unit casing cylindrical sections 73 and 80 in the rear frame casing opening 74 and in the bulkhead opening 84 of the front frame casing adds to the rigidity of the tractor body frame. A plurality of side wall openings 85, one being shown in Fig. 2, accommodates transfer of lubricant between the interior of this casing 72 and the tractor body compartment 44.

With continued reference to the torque amplifying unit 53, the rearward end of the casing 72 contains an anti-friction bearing unit 86 wherein there is journaled an output shaft 87 having a sun gear 88 on its inner or forward end and having respectively small and large diameter gears 89 and 91 on a rear end portion thereof. This shaft 87 is for transmitting power to the power input element 82 of the change-speed transmission 83, such transmission of power taking place through the gear 89 and a gear 92 with which the power input element or tubular countershaft 82 is constrained for rotation. The gear 91 is for transmitting power to a belt pulley (not shown).

A planet gear carrier 93 comprises end plates 94 and 95 rigidly connected to a carrier frame by bearing rods 96 (one being shown), spaced circumferentially about the axis of the output shaft 87. The carrier end plate 94 has a tubular extension 97 journaled upon the inner periphery of a ring 98 within the casing 72 by means of anti-friction bearing rollers 99. A section 101 of the ring 98 forms the outer element of an over-running clutch unit 102, whereas a section 103 of the tubular element 97 forms the cammed inner part of such over-running clutch cooperable with clutch rollers 104 to prevent rotation of the carrier 93 counter-clockwise, as viewed from the right end of the figure, while permitting clockwise rotation of the carrier.

A tubular extension 105 of the carrier plate 95 constitutes a control element for the torque amplifying unit 53 and is journaled within the front wall of the casing 72 upon an anti-friction bearing unit 106. An annular seal 107 prevents leakage of lubricant from the interior of the casing 72 into the dry compartment 42. A clutch backing plate element 108 is splined to the tubular control element 105 at 109 and has constrained for rotation therewith a pressure plate 111 which is urged by springs 112 to press a disk 113 of the clutch 52 between the parts 111 and 108. This disk 113 is splined at 114 to an extension 115 of the drive shaft 21 and splined thereto at 116. Clutch 52 is normally held engaged by springs 112 but can be released at will by rearward movement of a clutch throw-out bearing 117 and consequent pivoting of clutch throw-out levers 118 upon fulcrum members 119 for pulling the pressure plate 111 forwardly from the backing plate 108. When the clutch 52 is engaged the drive shaft 21—115 and the control element 105 of the torque amplifying unit 53 will be constrained for unitary rotation, and when the clutch is disengaged the drive shaft 21—115 can rotate relatively to the element 105.

Each of the bearing shafts 96 of the planetary gear carrier 93 has a gear cluster 121 journaled thereon. Each cluster comprises a small diameter gear 122 meshed with the sun gear 88 and a large diameter gear 123 meshed with a sun gear 124 on the back end of the drive shaft component 115. An annular sealing element 125 coacts between the tubular control element 105 and the drive shaft component 115 to prevent escape of lubricant (between these parts) from the interior of the carrier 93 into the dry compartment 42.

*Operation of the apparatus*

Inasmuch as the tubular drive shaft 22 is coupled through the main clutch backing plate 23 and the flywheel 18 with the engine crankshaft 19, this drive shaft will rotate continuously irrespective of whether the main clutch C is engaged or disengaged. The gears 63 and 64 are, therefore, operable from the constantly driven shaft 22 to cause constant rotation of the power take-off shaft 65—65a.

In the normal operation of the vehicle, the two clutches C and 52 will be engaged and the change-speed transmission unit 83 will have a power-transmitting connection established therein for transmitting power from the tubular countershaft 82 to the traction wheels 13 of the vehicle. When the clutch 52 is engaged, whereby the control element 105 and the planetary gear carrier 93 are constrained for rotation with the drive shaft 21—115, the planetary gearing of the torque-amplifying unit 53 will be locked up, whereby the power output shaft 87 of this unit is caused to rotate in unison with the drive shaft 21—115. Under these circumstances the gear 89 is driven at engine speed counter-clockwise as viewed from the rear or left end of the drawing in Fig. 2, and through the gear 92 drives the transmission countershaft 82 in the direction for causing forward movement of the vehicle providing the change-speed gear unit 83 is set for forward drive. While the vehicle is thus being driven forwardly, should an overload condition be encountered that would normally prevent continued movement of the vehicle in the forward speed connection established in the change-speed transmission 83, the operator of the tractor can release the clutch 52 by pulling rearwardly upon a control lever 126, thereby moving a rod 127 and the lower end of an arm 128 rearwardly and thus rotate a shaft 129 and a shifter fork 131 constrained for rotation therewith clockwise as viewed in Fig. 2 for shifting the throw-out bearing 32 rearwardly. When the clutch 52 is thus released, the sun gear 124, in rotating the gear clusters 121 clockwise about their axes while the gears 122 react upon the sun gear 88, tends to rotate the carrier 93 clockwise, as viewed from the left end of the drawing. However, this clockwise rotational tendency of the carrier 93 is prevented by the over-running brake 102, and because of the relative diameters of the gears 88, 122, 123 and 124, the output shaft 87 will be rotated in the same direction as the driven shaft 21—115 but at reduced speed and amplified torque. The ratio of this reduced speed of the power output shaft 87 relatively to the drive shaft 21—115 and the magnitude of the increased torque is predeterminable by preselection of the pitch diameters of the gears 88, 122, 123 and 124. It follows, therefore, that without the operator necessarily bringing the vehicle to rest for shifting the change-speed transmission unit 83 into a lower speed connection for increasing the torque transmittable to the vehicle traction wheels, he can instantaneously obtain this additional torque for meeting emergency driving conditions by simply pulling rearwardly upon the control lever 126, Fig. 1, to disengage the clutch 52. The operator may maintain this increased torque driving condition for any time desired without holding on to the lever 126 by simply allowing a catch 132 on such lever to spring upwardly in a notch 133 of a quadrant 134 associated with such lever. When the emergency driving condition has terminated, the operator will press down upon a control rod 135 at the upper end of the lever 126 to release the catch 132 and thereby permit the clutch 52 to be reengaged by the force of its spring 112. This establishes the normal driving condition of the apparatus with the planetary gearing of the torque amplifying unit 53 locked up whereby the power input from the element 87 to the change-speed transmission unit 83 will be at engine speed.

Having thus described a single preferred embodiment of the invention with the view of clearly and concisely illustrating the same, we claim:

1. In a tractor power transmitting and dividing apparatus, a tractor body frame having a front frame casing and a rear frame casing separably connected together at a forward end of the rear casing and at a rear end of the front casing, the front casing being compartmented and having a forward hollow transverse bulkhead separating a forward compartment from a central compartment, the front casing also having a rear bulkhead separating the central compartment from a rear compartment, the forward bulkhead having forward and rearward walls containing axially aligned openings in upper portions thereof, the rear bulkhead having an opening axially aligned with the aforesaid openings, a bracing wall extending between the bulkheads and embracing a shaft-receiving channel communicating between the rear compartment and the hollow bulkhead, said channel being communicatively isolated from the central compartment, driving shaft means extending from the forward compartment through the axially aligned openings, a gear mounted on said shaft means and constrained for rotation therewith in the hollow bulkhead, a power-take-off shaft extending rearwardly from the interior of the hollow bulkhead through said channel and the rear bulkhead into the rear frame casing, a gear on the forward end of the power-take-off shaft and meshed with the first-named gear, a torque-amplifying unit casing mounted on the front end of the rear frame casing and projecting in piloted relation within the rear bulkhead opening to rigidify the structural connection of the front and rear casings, the torque-amplifying unit being driven by the driving shaft means and comprising a driven shaft extending rearwardly from the casing thereof into the rear frame casing, the torque-amplifying unit also comprising an element constrainable for rotation with the drive shaft structure to cause the driven shaft to rotate in unison with the drive shaft means, said element projecting forwardly through the rear bulkhead opening into the central compartment, clutch means within the central compartment selectively engageable to constrain the element to rotate with the drive shaft means or disengageable to cause speed reduction drive of said driven shaft from the drive shaft means, and sealing means in the bulkhead openings to resist migration of lubricant from the interior of the hollow bulkhead and from the torque-amplifying unit casing into the central compartment.

2. In a tractor power transmitting and dividing apparatus, a tractor body frame casing having a forward hollow transverse bulkhead separating a forward compartment of such casing from a central compartment thereof, said casing also having a rear bulkhead separating the central compartment from a rear compartment, the forward bulkhead having forward and rearward walls containing axially aligned openings in upper portions thereof, the rear bulkhead having an opening axially aligned with the aforesaid openings, a bracing wall extending between the bulkheads and embracing a shaft-receiving channel communicating between the rear compartment and the hollow bulkhead, said channel being communicatively isolated from the central compartment, driving shaft means extending from the forward compartment through the axially aligned openings, a gear mounted on said shaft means and constrained for rotation therewith in the hollow bulkhead, a power-take-off shaft extending rearwardly from the interior of the hollow bulkhead through said channel and the rear bulkhead, a gear on the forward end of the power-take-off shaft and meshed with the first-named gear, a torque-amplifying unit casing mounted in the rear compartment in alignment with the drive shaft means from which such unit is driven, the torque-amplifying unit comprising a driven shaft extending rearwardly from the casing thereof, the torque-amplifying unit also comprising an element constrainable for rotation with the drive shaft structure to cause the driven shaft to rotate in unison with the drive shaft means, said element projecting forwardly through the rear bulkhead opening into the central compartment, clutch means within the central compartment selectively engageable to constrain the element to rotate with the driving shaft means or disengageable to cause speed reduction drive of said driven shaft from the drive shaft means, and sealing means in the bulkhead openings to resist migration of lubricant from the interior of the hollow bulkhead and from the torque-amplifying unit casing into the central bulkhead.

3. In a tractor power transmitting and dividing apparatus, a tractor body frame casing, traction propelling means supporting said frame casing, a change-speed unit in a rear portion of said frame casing and including a power input element drivable for transmitting driving force through such unit to the propelling means, the frame casing having a forward hollow transverse bulkhead separating a forward compartment of such casing from a central compartment thereof, said casing also having a more rearward bulkhead at the rear side of the central compartment, the forward bulkhead having forward and rearward walls containing axially aligned openings in upper portions thereof, the rearward bulkhead having an opening axially aligned with the aforesaid openings, a bracing wall extending between the bulkheads and embracing a shaft-receiving channel communicating between the hollow bulkhead and the interior of the frame casing rearwardly of the more rearward bulkhead, the channel being communicatively isolated from the central compartment, a tubular drive shaft extending from the forward compartment through the forward bulkhead wall opening into the hollow bulkhead, a gear mounted on said shaft and constrained to rotate therewith in the hollow bulkhead, a power-take-off shaft extending rearwardly from the interior of the hollow bulkhead through said channel and outwardly through the rear of the frame casing, a gear on the forward end of the power-take-off shaft and meshed with the first-named gear, an inner drive shaft extending rearwardly from the forward compartment through the tubular shaft and the bulkhead openings, a torque-amplifying unit in the frame casing between the rearward bulkhead and the change-speed unit and drivingly connected between the inner drive shaft and the power input element of such change-speed unit, the torque-amplifying unit comprising a tubular control element projecting forwardly concentrically about the inner drive shaft into the central compartment and constrainable for rotation with such drive shaft to cause the torque-amplifying unit to drive the change-speed input element at the speed of the inner drive shaft, friction clutch means in the central compartment and selectively engageable to constrain said element to rotate with said inner drive shaft or disengageable to cause the torque-amplifying unit to drive the power input element at reduced speed, and sealing means in the openings in the rear wall of the hollow bulkhead and in the more rearward bulkhead and cooperating with the tubular drive shaft and with the tubular control element to resist passage of lubricant through such openings into the central compartment.

4. In a tractor, a body frame having a front frame casing and a rear frame casing separably connected together at a forward end of the rear casing and at a rear end of the front casing, the forward casing being compartmented and having a forward transverse bulkhead separating a forward compartment from a central compartment, the front casing also having a rear bulkhead separating the central compartment from a rear compartment, said bulkheads having axially aligned openings in upper portions thereof, a drive shaft extending from the forward compartment through said openings, a torque-amplifying unit casing mounted on the front end of the rear frame casing and projecting in piloted relation within the rear bulkhead opening to rigidify the structural connection of the front and rear frame casings, the torque-amplifying unit being driven by the drive shaft and comprising a driven shaft extending rearwardly from the casing thereof into the rear frame casing, the torque-amplifying unit also comprising an element constrainable for rotation with the drive shaft structure to cause the driven shaft to rotate in unison with the drive shaft means, said element projecting forwardly through the rear bulkhead opening into the central compartment, clutch means within the central compartment selectively engageable to constrain the element to rotate with the drive shaft means or disengageable to cause speed reduction drive of said driven shaft from the drive shaft means.

5. In a tractor, a body frame casing having a forward hollow transverse bulkhead separating a forward compartment of such casing from a central compartment therein, said bulkhead having forward and rearward walls containing axially aligned openings in upper portions thereof, a drive shaft for the tractor extending rearwardly from the forward compartment through said openings, a tubular drive shaft concentrically about said drive shaft and extending rearwardly from the front compartment into the hollow bulkhead, a body-reinforcing bulkhead at the rear side of the central compartment, a bracing wall reaching between the rear wall of the hollow bulkhead and the more rearward bulkhead and embracing a shaft-receiving channel communicating between the hollow bulkhead and the interior of the frame casing rearwardly of the more rearward bulkhead, said channel being communicatively isolated with respect to the central compartment, a power-take-off shaft having a forward end portion in the hollow bulkhead and extending rearwardly through said channel and the body casing, and intermeshing gears in the hollow bulkhead respectively on the tubular drive shaft and the power-take-off shaft with which they are constrained for rotation.

6. In a tractor, a body frame having a front frame casing and a rear frame casing separably connected together at the forward end of the rear casing and the rear end of the front casing, the forward casing being compartmented and having a forward hollow transverse bulkhead separating a main-clutch-accommodating bell-housing compartment from a more rearward torque-amplifier-clutch accommodating central compartment, said bulkhead having forward and rearward walls containing axially aligned openings respectively in upper portions thereof, a more rearward bulkhead upon the rear side of the central compartment and spaced forwardly from the rear end of the front body casing, the more rearward bulkhead including an opening in the upper portion thereof aligned with the first-named openings and cooperable therewith for accommodating a torque-amplifier drive shaft, a bracing wall extending between the rear wall of the hollow bulkhead and the more rearward bulkhead in lower portions thereof, said bracing wall embracing a shaft-receiving channel communicating between the interior of the hollow bulkhead and space within the front body casing rearwardly of the more rearward bulkhead, and a torque-amplifying-unit casing mounted upon the front end of the rear body casing and projecting forwardly into piloting relation within the more rearward bulkhead opening to rigidify the structural connection of the front and rear casings.

7. The combination as set forth in claim 6, wherein the front body casing and the rear body casing are intercommunicative at the lower portions of their connected ends, and wherein said bracing wall contains a surge passage communicating between the lower interior of the hollow bulkhead and space within the frame body rearwardly of the more rearward bulkhead at a lower portion thereof.

8. In a tractor power transmitting and dividing apparatus, a tractor body frame having a front frame casing and a rear frame casing separably connected together at a forward end of the rear casing and at a rear end of the front casing, the front casing being compartmented and having a forward hollow transverse bulkhead separating a forward compartment from a central compartment, the front casing also having a rear bulkhead separating the central compartment from a rear compartment, the forward bulkhead having forward and rearward walls containing axially aligned openings in upper portions thereof, the rear bulkhead having an opening axially aligned with the aforesaid openings, a bracing wall extending between the bulkheads and embracing a shaft-receiving channel communicating between the rear compartment and the hollow bulkhead, said channel being communicatively isolated from the central compartment, driving shaft means extending from the forward compartment through the axially aligned openings, a gear mounted on said shaft means and constrained for rotation therewith in the hollow bulkhead, a power-take-off shaft extending rearwardly from the interior of the hollow bulkhead through said channel and the rear bulkhead into the rear frame casing, a gear on the forward end of the power-take-off shaft and meshed with the first-named gear, a torque-amplifying unit casing extending between the rear bulkhead of the front frame casing and a front portion of the rear frame casing to rigidify the structural connection of the front and rear casings, the torque-amplifying unit being driven by the driving shaft means and comprising a driven shaft extending rearwardly from the casing thereof into the rear frame casing, the torque-amplifying unit also comprising an element constrainable for rotation with the drive shaft structure to cause the driven shaft to rotate in unison with the drive shaft means, said element projecting forwardly through the rear bulkhead opening into the central compartment, clutch means within the central compartment selectively engageable to constrain the element to rotate with the drive shaft means or disengageable to cause speed reduction drive of said driven shaft from the drive shaft means, and sealing means in the bulkhead openings to resist migration of lubricant from the interior of the hollow bulkhead and from the torque-amplifying unit casing into the central compartment.

9. In a tractor power transmitting and dividing apparatus, a tractor body frame having a front frame casing and a rear frame casing separably connected together at a forward end of the rear casing and at a rear end of the front casing, the front casing being compartmented and having a forward hollow transverse bulkhead separating a forward compartment from a central compartment, the front casing also having a rear bulkhead separating the central compartment from a rear compartment, the forward bulkhead having forward and rearward walls containing axially aligned openings in upper portions thereof, the rear bulkhead having an opening axially aligned with the aforesaid openings, a bracing wall extending between the bulkheads and embracing a shaft-receiving channel communicating between the rear compartment and the hollow bulkhead, said channel being communicatively isolated from the central compartment, driving shaft means extending from the forward compartment through the axially aligned openings, a gear mounted on said shaft means and constrained for rotation therewith in the hollow bulkhead, a power-take-off shaft extending rearwardly from the interior of the hollow bulkhead through said channel and the rear bulkhead into the rear frame casing, a gear on the forward end of the power-take-off shaft and meshed with the first-named gear, a torque-amplifying unit casing extending between the rear bulkhead of the front frame casing and a front portion of the rear frame casing, said unit casing being rigidly assembled with one of the frame casings and the other frame casing having a pilot portion in telescopic relation with a portion of said unit casing to rigidify the structural connection of the front and rear casings, the torque-amplifying unit being driven by the driving shaft means and comprising a driven shaft extending rearwardly from the casing thereof into the rear frame casing, the torque-amplifying unit also comprising an element constrainable for rotation with the drive shaft structure to cause the driven shaft to rotate in unison with the drive shaft means, said element projecting forwardly through the rear bulkhead opening into the central compartment, clutch means within the central compartment selectively engageable to constrain the element to rotate with the drive shaft means or disengageable to cause speed reduction drive of said driven shaft from the drive shaft means, and sealing means in the bulkhead openings to resist migration of lubricant from the interior of the hollow bulkhead and from the torque-amplifying unit casing into the central compartment.

10. In a tractor, a body frame having a front frame casing and a rear frame casing separably connected together at a forward end of the rear casing and at a rear end of the front casing, the forward casing being compartmented and having a forward transverse bulkhead separating a forward compartment from a central compartment, the front casing also having a rear bulkhead separating the central compartment from a rear compartment, said bulkheads having axially aligned openings in upper portions thereof, a drive shaft extending from the forward compartment through said openings, a torque-amplifying unit casing extending between the rear bulkhead of the front frame casing and a front portion of the rear frame casing, said unit casing being rigidly assembled with one of the frame casings and the other frame casing having a pilot portion in telescopic relation with a portion of said unit casing to rigidify the structural connection of the front and rear frame casings, the torque-amplifying unit being driven by the drive shaft and comprising a driven shaft extending rearwardly from the casing thereof into the rear frame casing, the torque-amplifying unit also comprising an element constrainable for rotation with the drive shaft structure to cause the driven shaft to rotate in unison with the drive shaft means, said element projecting forwardly through the rear bulkhead opening into the central compartment, clutch means within the central compartment selectively engageable to constrain the element to rotate with the drive shaft means or disengageable to cause speed reduction drive of said driven shaft from the drive shaft means.

11. In a tractor, a body frame having a front frame casing and a rear frame casing separably connected together at the forward end of the rear casing and the rear end of the front casing, the forward casing being compartmented and having a forward hollow transverse bulkhead separating a main-clutch-accommodating bell-housing compartment from a more rearward torque-amplifier-clutch accommodating central compartment, said bulkhead having forward and rearward walls containing axially aligned openings respectively in upper portions thereof, a more rearward bulkhead upon the rear side of the central compartment and spaced forwardly from the rear end of the front body casing, the more rearward bulkhead including an opening in the upper portion thereof aligned with the first-named openings and cooperable therewith for accommodating a torque-amplifier drive shaft, a bracing wall extending between the rear wall of the hollow bulkhead and the more rearward bulkhead in lower portions thereof, said bracing wall embracing a shaft-receiving channel communicating between the interior of the hollow bulkhead and space within the front body casing rearwardly of the more rearward bulkhead, and a torque-amplifying-unit casing extending between the rear bulkhead of the front frame casing and a front portion of the rear frame casing, said unit casing being rigidly assembled with one of the frame casings and the other frame casing having a pilot portion in telescopic relation with a portion of said unit casing to rigidify the structural connection of the front and rear casings.

HENRY A. FERGUSON.
RALPH C. BOYLE.
EDMUND JEDRZYKOWSKI.

No references cited.